US010921959B2

(12) United States Patent
Swaminathan et al.

(10) Patent No.: US 10,921,959 B2
(45) Date of Patent: Feb. 16, 2021

(54) CUSTOMER SERVICE MANAGEMENT WORKSPACE

(71) Applicant: ServiceNow, Inc., Santa Clara, CA (US)

(72) Inventors: Rajesh Swaminathan, Union City, CA (US); Ruchika Dhingra, San Jose, CA (US); Sathiyan Seran, Fremont, CA (US)

(73) Assignee: ServiceNow, Inc., Santa Clara, CA (US)

( * ) Notice: Subject to any disclaimer, the term of this patent is extended or adjusted under 35 U.S.C. 154(b) by 56 days.

(21) Appl. No.: 15/583,781

(22) Filed: May 1, 2017

(65) Prior Publication Data
US 2018/0314396 A1 Nov. 1, 2018

(51) Int. Cl.
| G06F 17/00 | (2019.01) |
| G06F 3/0483 | (2013.01) |
| G06Q 10/10 | (2012.01) |
| G06Q 30/00 | (2012.01) |
| G06F 3/0482 | (2013.01) |
| G06F 3/0485 | (2013.01) |
| G06Q 10/06 | (2012.01) |

(52) U.S. Cl.
CPC .......... *G06F 3/0483* (2013.01); *G06F 3/0482* (2013.01); *G06F 3/0485* (2013.01); *G06Q 10/063* (2013.01); *G06Q 10/10* (2013.01); *G06Q 30/016* (2013.01)

(58) Field of Classification Search
CPC ............ G06F 17/30528; G06F 3/0481; G06Q 30/016
See application file for complete search history.

(56) References Cited

U.S. PATENT DOCUMENTS

| 6,581,067 B1 * | 6/2003 | Bjergo .................. G06Q 10/02 |
| 6,609,122 B1 | 8/2003 | Ensor |
| 7,028,301 B2 | 4/2006 | Ding |

(Continued)

FOREIGN PATENT DOCUMENTS

| WO | 200133430 A1 | 5/2001 |
| WO | 2010104618 A1 | 9/2010 |

OTHER PUBLICATIONS

Extended European Search Report for European Application No. 18165205.8 dated May 14, 2018; 6 pgs.

(Continued)

*Primary Examiner* — Scott T Baderman
*Assistant Examiner* — Barbara M Level

(57) ABSTRACT

A workspace system includes a non-transitory, machine-readable medium and one or more processors that executes instructions stored in the non-transitory, machine-readable media to perform operations. The operations include generating a list of records in a workspace, wherein the list provides the records in a card layout and a table layout. The operations also include receiving a selection of at least one record from the list. The operations further include generating at least one tab in the workspace based at least on the selection of the at least one record. The operations also include generating tab content associated with the at least one tab, wherein the tab content provides a ribbon container and includes one or more form sections configured in columns in the workspace.

18 Claims, 9 Drawing Sheets

(56) References Cited

U.S. PATENT DOCUMENTS

| | | |
|---|---|---|
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 1/2011 | Gerber |
| 7,930,396 B2 | 4/2011 | Trinon |
| 7,945,860 B2 | 5/2011 | Vampenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 9,239,857 B2 | 1/2016 | Trinon |
| 9,535,737 B2 | 1/2017 | Joy |
| 9,633,012 B1 * | 4/2017 | Eveland ............ G06F 17/30011 |
| 9,792,387 B2 | 10/2017 | George |
| 9,881,066 B1 * | 1/2018 | Yousaf ................. G06F 16/248 |
| 2004/0015309 A1 | 1/2004 | Swisher et al. |
| 2004/0186860 A1 * | 9/2004 | Lee ......................... G06F 9/542 |
| 2005/0160019 A1 * | 7/2005 | Cluse ..................... G06Q 40/00 705/35 |
| 2008/0010248 A1 * | 1/2008 | Vautier ................... G06Q 10/10 |
| 2008/0046803 A1 | 2/2008 | Beachamp et al. |
| 2008/0215477 A1 * | 9/2008 | Annunziata ............ G06Q 40/04 705/37 |
| 2011/0225506 A1 * | 9/2011 | Casalaina ......... G06F 17/30528 715/741 |
| 2011/0313805 A1 | 12/2011 | Hydemann et al. |
| 2011/0314395 A1 * | 12/2011 | Stenerson ............. G06F 16/972 715/760 |
| 2012/0110515 A1 * | 5/2012 | Abramoff ............. G06F 16/904 715/854 |
| 2013/0091132 A1 | 4/2013 | Khalatov et al. |
| 2013/0173720 A1 | 7/2013 | Vasudev et al. |
| 2013/0262277 A1 | 10/2013 | Clark, Jr. et al. |
| 2014/0032597 A1 | 1/2014 | Ellis et al. |
| 2014/0115527 A1 | 4/2014 | Pepper et al. |
| 2015/0006298 A1 * | 1/2015 | Ross .................. G06Q 30/0269 705/14.66 |

OTHER PUBLICATIONS

European Examination Report, Application No. 18165205.8, dated Jun. 14, 2019.

* cited by examiner

| | | | WORKSPACE | | | | USERNAME |
|---|---|---|---|---|---|---|---|
| ← C | http://WEBSITE | | | | | | ⊙ USERNAME |

WORKSPACE — 46

ACCOUNTS

🔍 KEYWORD SEARCH:

| ACCT00000001 | ABC COMPANY US | | |
|---|---|---|---|
| PRIMARY CONTACT | ADAM SMITH | WEBSITE | ABCCOMPANY.COM |
| | | PHONE | 1.888.8888888 |
| | | CITY | SAN FRANCISCO |

CUSTOMER

| ACCT00000002 | ABC COMPANY CANADA | | |
|---|---|---|---|
| PRIMARY CONTACT | JANE BURGER | PHONE | 1.800.2222222 |
| | | CITY | TORONTO |

CUSTOMER

| ACCT00000003 | ABC COMPANY UK | | |
|---|---|---|---|
| PRIMARY CONTACT | MICHEAL ABRAMS | PHONE | 1.800.1111111 |
| | | CITY | LONDON |

CUSTOMER

| ACCT00000004 | BBC INC. NA |
|---|---|

---

CASE CASE001 — 50    TASK TASK005 ⊗ — 80

| | CLOSE CASE | ASSIGN TO ME | OPEN CASE | SAVE |

CUSTOMER
- ☆ ADAM SMITH
- ☐ ABC COMPANY
- ✉ ADAM.SMITH@ABCCOMPANY.COM
- 📞 888.8888888 — 58

CASE-PRIORITY 2
RESOLUTION (24 HOURS)
20.15:19:30 BREACHED

TIMELINE-BEGAN 2 MONTHS AGO-
UPDATED 2 YEARS AGO

0 SECONDS WITH AGENT
2 YEARS WITH CUSTOMER

| MAIN | TASK SLA(2) | TASK(3) | PHONE (0) | APPOINTMENT(0) | EMAILS(1) | RELATED CASES (5) | PROBLEM(0) | ORDERS |

— 110

CASES

| NUMBER | TASK TYPE | SHORT DESCRIPTION | PRIORITY |
|---|---|---|---|
| CS0006730 | CASE | ROUTER HARDWARE UPGRADE | 2-HIGH |
| CS0000001 | CASE | ISSUE WITH ROUTER | 1-CRITICAL |
| CS0000005 | CASE | URGENT ISSUE, NEED HELP.... | 1-CRITICAL |
| CS0000009 | CASE | ASVANCED AND LARGE ROUTERS MAKING NOISE | 3-MODERATE |
| CS0001003 | CASE | ROUTER KEEPS DROPPING CONNECTION | 3-MODERATE |

< > ROWS 1-5 OF 5

FIG. 8

CUSTOMER SERVICE MANAGEMENT WORKSPACE

TECHNICAL FIELD

The present disclosure relates generally to customer service management. More specifically, the present disclosure is related to managing customer service issues using a workspace provided in a graphical user interface.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Customer service agents often work in demanding environments (e.g., call centers) where they attempt to provide fast, competent service to their customers while meeting stringent case load, issue resolution deadlines, and customer satisfaction targets. The agents may use workspaces provided by graphical user interfaces to manage customer service issues. However, navigating through such workspaces to reach a desired page, form, tool, data, etc., may involve substantial scrolling, navigating through intermediary pages, selecting a variety of tabs, navigating back and forth between forms, and the like. These additional steps are often inefficient and create delays in providing customer service to customers.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

To increase efficiency and productivity of customer service agents, a workspace used to manage customer service issues via a graphical user interface may provide a single page or screen that displays and provides customer service information related to a customer service record. The customer service record may be associated with a customer service case, account, or contact. The workspace, provided as a single page or screen, may reduce scrolling to access relevant information, may enable simultaneously viewing of other details relevant to the record, and/or may reduce navigating back and forth between forms that provide structured display of information in fields.

Moreover, the workspace may include a customizable layout that may, for instance, include collapsible form sections across multiple columns of a respective form. The collapsible form sections may enable higher data density and more convenient access to information. The workspace may also include summary information of related records (e.g., account summaries, service level agreements, timelines, case histories, customer data, and the like). The workspace may further enable navigation over different levels of information (e.g., navigating to related records, such as sibling, parent, or child records) without losing context of the workspace. The context may include a last position of, information entered in, and/or a collapse/expansion of a record, tab, form, form section, and the like, that a user was viewing before navigating away. The workspace may also facilitate or enable accessing or viewing external content contextually without replicating data of a desired record. The workspace may further include an enhanced list view of a record layout and a tabular layout to display varying levels of details of each record. The workspace may also include a context-aware footer to enable related actions to be performed. The workspace may further include a configurable framework. In this manner, the workspace may reduce navigating, scrolling, or other pointer-device movements to access relevant information, enable simultaneously viewing of other details relevant to customer service records, and reduce navigating back and forth between forms, thus increasing efficiency and productivity in providing customer service to customers.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

FIG. 3 is an example screenshot of a workspace provided by the graphical user interface of FIG. 1 that uses a single page to display customer service information related to a customer service record;

FIG. 4 depicts the workspace of FIG. 3 with multiple tabs open, in accordance with an embodiment of the present disclosure;

FIG. 5 depicts the workspace of FIG. 4 with a form section horizontally collapsed, in accordance with an embodiment of the present disclosure;

FIG. 7 depicts the workspace of FIG. 4 with a related cases form selected, in accordance with an embodiment of the present disclosure;

FIG. 8 depicts the workspace of FIG. 4 with an email component open, in accordance with an embodiment of the present disclosure.

DETAILED DESCRIPTION

Figure 1:
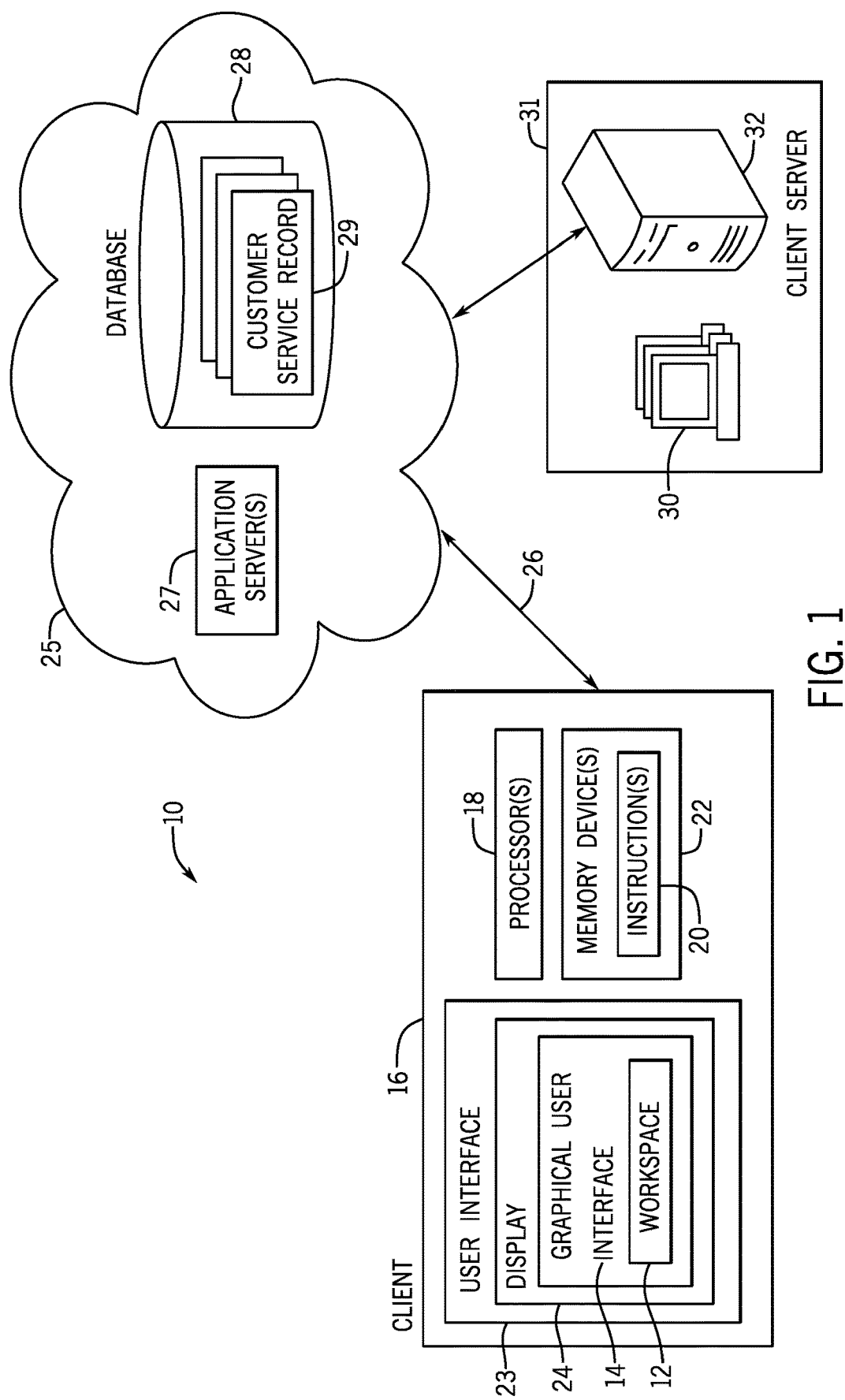
FIG. 1 is a block diagram of a customer service management system using a workspace provided by a graphical user interface, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

To increase efficiency and productivity of users who regularly interact with complex presentations of inter-related data, such as customer service agents, a workspace used to manage data or records via a graphical user interface may provide a single page that displays and provides information (e.g., customer service information) related to a given record (e.g., a customer service record). An example of such a record may be a customer service record associated with a customer service case, account, or contact. The workspace may reduce scrolling to access relevant information, enable simultaneously viewing of other details relevant to the record, and reduce navigating back and forth between forms that provide structured display of information in fields. As will be appreciated, though customer service examples are described herein, such examples merely provide a useful real-world context by which the present approach may be appreciated and which may facilitate explanation of the present contexts. Such examples, however, are merely illustrative and are not intended to limit the present approach, which may instead be applicable to a wide array of instances in which display, arrangement, and accessibility of a record or other data is relevant.

With this in mind, in one embodiment, a workspace system includes a non-transitory, machine-readable medium and one or more processors that execute instructions stored in the non-transitory, machine-readable media to perform operations. The operations include generating a list of records in a workspace, wherein the list provides the records in a card layout and a table layout. The operations also include receiving a selection of at least one record from the list. The operations further include generating at least one tab in the workspace based at least on the selection of the at least one record. The operations also include generating tab content associated with the at least one tab, wherein the tab content provides a ribbon container and includes one or more form sections configured in columns (or other defined sub-spaces) in the workspace. In this manner, the workspace may reduce scrolling to access relevant information, enable simultaneously viewing of other details relevant to customer service records, and reduce navigating back and forth between forms, thus increasing efficiency and productivity in providing customer service to customers.

By way of introduction, FIG. 1 is a block diagram of a customer service management system 10 using a workspace 12 provided by a graphical user interface 14, in accordance with an embodiment of the present disclosure. As illustrated, the customer service management system 10 includes a client 16. The client 16 may include any suitable computing system. For instance, the client 16 may include one or more computing devices, such as a mobile phone, a tablet computer, a laptop computer, a notebook computer, a desktop computer, a server, or any other suitable computing device or combination of computing devices. The client 16 may include one or more client application programs running on the computing device(s). The client 16 may be implemented using a single physical unit or a combination of physical units (e.g., distributed computing) running the client application program(s). In some embodiments, a single physical unit (e.g., a server) may run multiple client application programs simultaneously.

The client 16 may include one or more processors 18 that may perform one or more instructions 20 stored in one or more memory devices 22. For example, the one or more processors may include microprocessors, systems on a chip (SoCs), or any other performing functions by executing instruction(s) 20 stored in the memory device(s) 22. Additionally or alternatively, the processor(s) 18 may include application-specific integrated circuits (ASICs), field-programmable gate arrays (FPGAs), and/or other devices designed to perform some or all of the functions discussed herein without calling the instruction(s) 20 from the memory device(s) 22. Moreover, the functions of the processor(s) 18 may be distributed across multiple processors in a single physical device or in multiple processors in more than one physical device. The processor(s) 18 may also include specialized processors, such as a graphics processing unit (GPU).

The memory device(s) 22 may include any tangible, non-transitory, and computer-readable storage media. For example, the memory device(s) 22 may include volatile memory, non-volatile memory, or any combination thereof. In some embodiments, the memory device(s) 22 may include read-only memory (ROM), randomly accessible memory (RAM), disk drives, solid state drives, external flash memory, or any combination thereof. Although shown as a single block in FIG. 1, the memory device(s) 22 may be implemented using multiple physical units in one or more physical locations.

The client 16 may also include a user interface 23 that may include any suitable input and output devices, such as a display 24 (e.g., a liquid crystal display, a cathode-ray tube, a light emitting diode display, an organic light emitting diode display, or other suitable display), a touchscreen, a keyboard, a mouse or trackball, a stylus, a keypad, speakers, and the like, to enable users to operate the workspace 12 to manage customer service issues. In particular, the user interface 23 includes the graphical user interface 14 that may enables users to interact with the client 16 through, for example, graphical icons, visual indicators, and the like. The graphical user interface 14 includes the workspace 12 that enables users to manage customer service issues. The workspace 12 is discussed in further detail in FIGS. 3-9 below.

As illustrated, the customer service management system 10 may use a distributed computing framework by communicating with a cloud service 25 over a communication channel 26. The cloud service 25 may include any suitable number of computing devices (e.g., computers) in one or more locations that are connected together using one or more networks. For instance, the cloud service 25 may include various computers acting as servers in datacenters at one or more geographic locations where the computers communicate using network and/or Internet connections. The communication channel 26 may include any suitable communication mechanism for electronic communication between the client 16 and the cloud service 25. The communication channel 26 may incorporate local area networks (LANs), wide area networks (WANs), virtual private networks (VPNs), cellular networks (e.g., long term evolution networks), and/or other network types for transferring data between the client 16 and the cloud service 25. For example, the communication channel 26 may include an Internet connection when the client 16 is not on a local network common with the cloud service 25. Additionally or alternatively, the communication channel 26 may include network connection sections when the client and the cloud service 25 are on different networks or entirely using network connections when the client 16 and the cloud service 25 share a common network. Although only a single client 15 is shown connected to the cloud service 25, it should be noted that cloud service 25 may connect to multiple clients (e.g., tens, hundreds, or thousands of clients).

Through the cloud service 25, the client 16 may connect to various devices with various functionality, such as gateways, routers, load balancers, databases, application servers running application programs on one or more nodes, or other devices that may be accessed via the cloud service 25. For example, the client 16 may connect to an application server 27 and/or one or more databases 28 via the cloud service 25. The application server 27 may include any computing system, such as a desktop computer, laptop computer, server computer, and/or any other computing device capable of providing functionality from an application program to the client 16. The application server 27 may include one or more application nodes running application programs whose functionality is provided to the client 16 via the cloud service 25. The application nodes may be implemented using processing threads, virtual machine instantiations, or other computing features of the application server 27. Moreover, the application nodes may store, evaluate, or retrieve data from the databases 28 and/or a database server.

The application server 27 may include or be configured to access the databases 28 that may store information associated with customer service records 29. The customer service records 28 may be associated with a customer service case, account, or contact. The databases 28 may also contain a series of tables containing information about assets and business services controlled by a client 16 and the configurations of these assets and services. The assets and services may include configuration items 30 that may be computers, other devices on a network 31 (or group of networks), software contracts and/or licenses, or business services. The configuration items 30 may include hardware resources (such as server computing devices, client computing devices, processors, memory, storage devices, networking devices, or power supplies); software resources (such as instructions executable by the hardware resources including application software or firmware); virtual resources (such as virtual machines or virtual storage devices); and/or storage constructs (such as data files, data directories, or storage models). As such, the configuration items 30 may include a combination of physical resources or virtual resources. For example, the configuration items 30 may include printers, routers/switches, load balancers, virtual systems, storage devices, and/or other connected devices (e.g., clusters of connected computing devices or functions such as data centers, computer rooms, databases, facility-controlling devices having aspects that are accessible via network communication, such as heating, ventilation, and air conditioning (HVAC) units, fuel tanks, power equipment, or other suitable devices). The databases 28 may include information related to configuration items 30, attributes (e.g., roles, characteristics of elements, etc.) associated with the configuration items 30, and/or relationships between the configuration items 30.

In some embodiments, the databases 28 may include a confirmation management database that may store the data concerning the configuration items 30 mentioned above along with data related various information technology assets that may be present within the network 31. In addition to the databases 28, the cloud service 25 may include one or more other database servers. The database servers are configured to store, manage, or otherwise provide data for delivering services to the client 16 over the communication channel 26. The database server may include one or more additional databases that are accessible by the application server 27, the client 16, and/or other devices external to the additional databases, such as a relational database, a time series database, and the like. In some embodiments, more than a single database server may be utilized. Furthermore, in some embodiments, the cloud service 25 may have access to one or more databases external to the cloud service 25 entirely.

In the depicted topology, access to the configuration items 30 from the cloud service 25 is enabled via a client server 32 (e.g., a management, instrumentation, and discovery server). In some embodiments, the access is provided via an External Communications Channel Queue. The client server 32 may include an application program (e.g., Java application) that runs as a service (e.g., Windows service or UNIX daemon) that facilitates communication and movement of data between the cloud service 25 and external applications, data sources, and/or services. The client server 32 may be executed using a computing device (e.g., server or computer) on the network 31 that communicates with the cloud service 25. As discussed below, the client server 32 may periodically or intermittently use discovery probes to determine information on devices connected to the network 31 and return the probe results back to the cloud service 25. In the illustrated embodiment, the client server 32 is located inside the network 31 thereby alleviating the use of a firewall in communication between the configuration items 30 and the client server 32. However, in some embodiments, a secure tunnel may be generated between a client server 32 running in the cloud service 25 that communicates with a border gateway device of the network 31.

Figure 2:
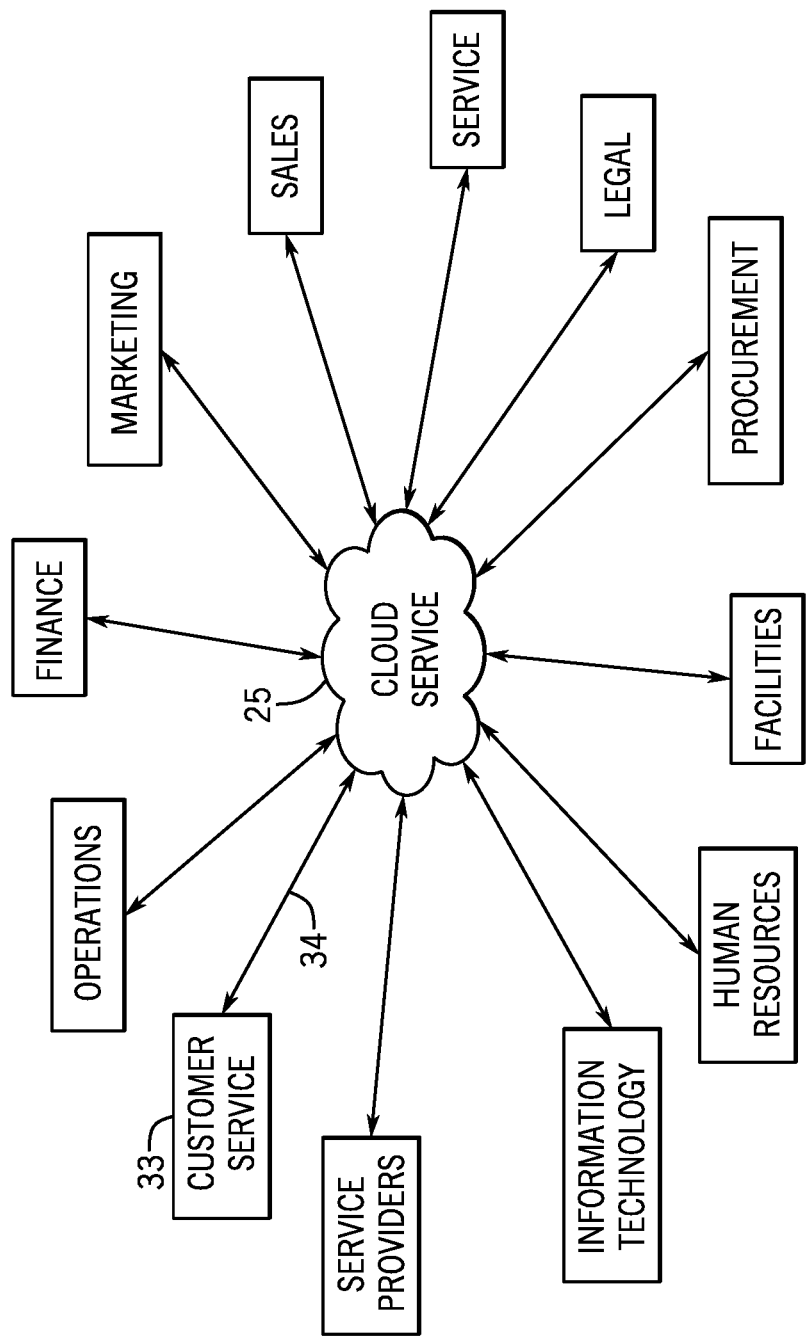
FIG. 2 depicts services that may be provided by a cloud service of the customer service management system of FIG. 1, in accordance with an embodiment of the present disclosure.

With this in mind, FIG. 2 depicts services 33 that may be provided by the cloud service 25, in accordance with an embodiment of the present disclosure. As illustrated, the services 33 may include customer service, operations, finance, marketing, sales, service, legal, procurement, facilities, human resources, information technology, and service providers. It should be understood that more or less suitable services may be provided instead of or along with any of the services 33 illustrated. The services 33 may be provided by any suitable number of computing devices (e.g., computers) in one or more locations that are connected together using one or more networks. The computing devices may be connected to the cloud service 25 using suitable communication channels 34, such as the communication channel 26.

Figure 3:
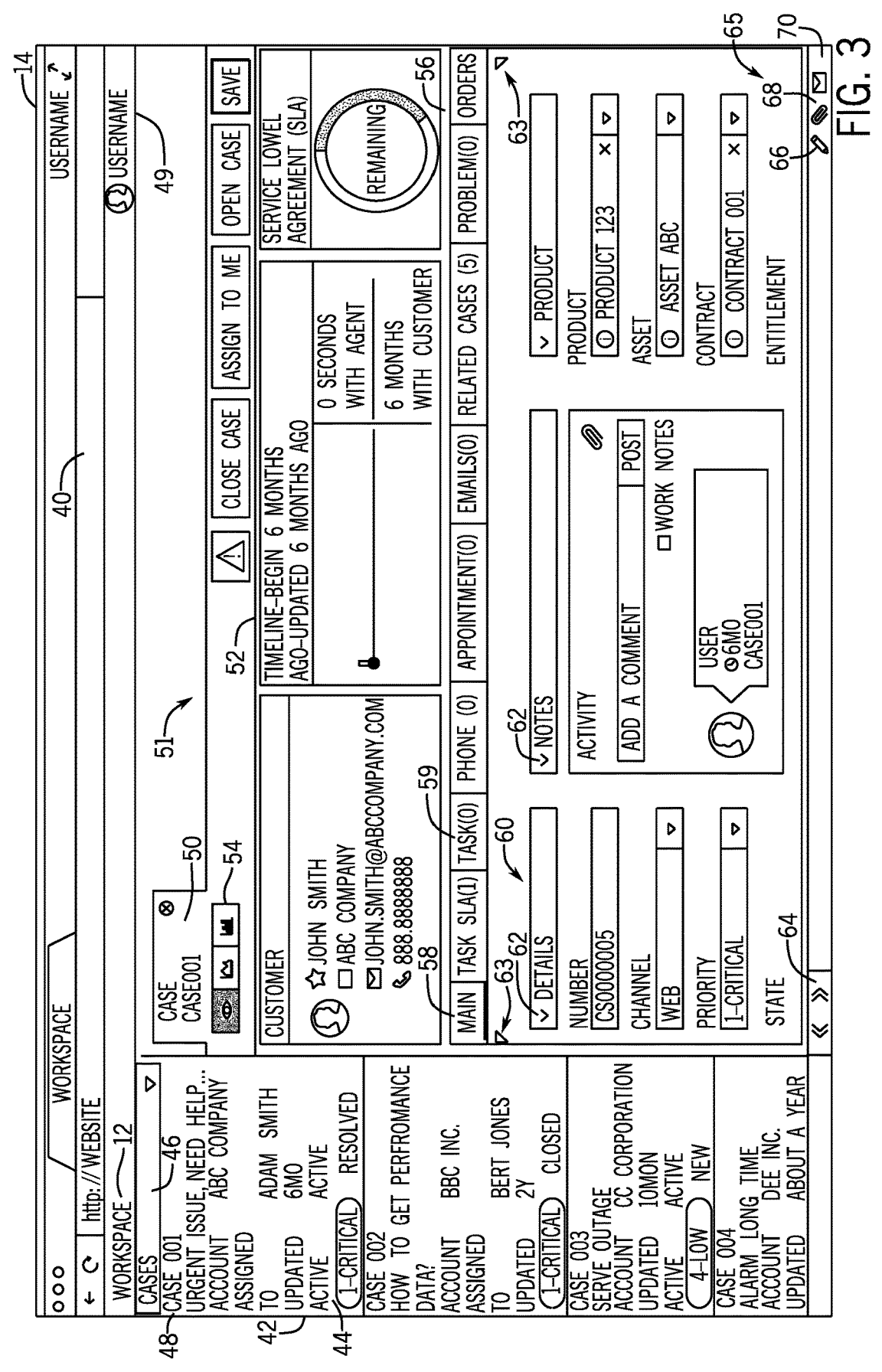

Turning now to FIG. 3, an example of a sample screen of a workspace 12 provided by the graphical user interface 14 of FIG. 1 that limits display of customer service information related to a customer service record 29 to a single page or screen, in accordance with an embodiment of the present disclosure, is illustrated. In some embodiments, the graphical user interface 14 may be provided by a software application stored in the memory device(s) executed by the processor(s) 18. In additional or alternative embodiments, the graphical user interface 14 may be provided in an interne browser running on the client 16, wherein at least a portion of the processes or routines used by the graphical user interface 14 are executed by the application server 27. For example, a user may run the graphical user interface 14 by entering a certain website 40 that enables the communication channel 26 with the cloud service 25.

The workspace 12 may include a customer service record list portion, area, or column 42 that lists one or more customer service records 44. A customer service record 44 may be associated with a customer service case, account, or contact. It should be understood that any other suitable customer service data may also be included as a customer service record 44, such as customer service departments, customer service topics, and the like. The workspace 12 may include a navigation menu that enables the user to select whether to list customer service cases, accounts, or contacts. While the navigation menu 46 is implemented in the form of a dropdown list in FIG. 3, it should be understood that the navigation menu 46 may be implemented in any suitable form, such as a set of buttons, a set of radio buttons, a text box, a set of check boxes, and the like. As illustrated, the user has selected customer service cases in the navigation menu 46, and, as such, the customer service record list portion 42 lists customer service cases 48. The customer service record list portion 42 may list the customer service records 44 in a card layout, such that each customer service record 44 is displayed as a card that includes any suitable information related to the listed customer service record 44, such as an identification number, a summary, an account holder, an account number, a status, and/or a responsible customer service agent.

For example, in FIG. 3, the customer service record list portion 42 displays a case number, an issue summary or title, an account holder, a last updated timestamp, one or more statuses, and a criticality rating. The processor(s) 18 may determine the information to be displayed by the workspace 12 based on a user identity. As such, the processor(s) 18 may only provide information to be displayed (or changed) by the workspace 12 if the user has permission to view (or change) the information. As illustrated, the workspace 12 may provide a user indication 49 of the user operating the workspace 12.

The processor(s) 18 may generate one or more tabs 50 in a tab portion 51 of the workspace 12 based on a user selection of a customer service record 44 listed in the customer service record list portion 42. In some embodiments, the processor(s) 18 may generate a tab 50 by default, such as when the workspace 12 is initially opened. For example, the processor(s) 18 may generate the tab 50 in FIG. 3 for "Case001" when the user first opens the workspace 12 because "Case001" is the first entry in the customer service record list portion 42. In some embodiments, the processor(s) 18 may generate a tab 50 by default when the workspace 12 is initially opened based on the last customer service record 44 that was changed, accessed, or opened by the user.

The tab 50 may include a summary portion or ribbon container 52 that displays summary or other relevant information for the customer service record 44. As illustrated, the summary portion 52 for "Case001" displays customer information, a timeline, and a service level agreement status for "Case001." It should be understood that any other suitable summary information may also be included in the summary portion 52, such as a responsible customer service agent, a last updated timestamp, and the like. Moreover, while the summary portion 52 displays three types of information (e.g., the customer information, the timeline, and the service level status), it should be understood that the summary portion 52 may display any suitable number (e.g., 1-20) of types of information. The tab 50 may also include a summary portion navigation menu or ribbon container menu 54 that enables the user to select different summary information (e.g., to be displayed in the summary portion 52). While the summary portion navigation menu 54 is implemented in the form of a set of buttons in FIG. 3, it should be understood that the summary portion navigation menu 54 may be implemented in any suitable form, such as a dropdown list, a set of radio buttons, a text box, a set of check boxes, and the like. Moreover, while the summary portion navigation menu 54 includes three selections (e.g., buttons), it should be understood that the summary portion navigation menu 54 may include any suitable number of selections (e.g., 2-10 selections or more).

The tab 50 may also include a form portion 56 that displays one or more forms 58. While the form portion 56 displays each form 58 as a tab in FIG. 3, it should be understood that the forms 58 may be displayed in any suitable form, such as a list of links to each form 58, a dropdown list, and the like. A form 58 may display and/or enable the user to change information associated with the customer service record 44. While FIG. 3 illustrates forms 58 associated with main information, task service level agreement information, task information, phone information, appointment information, email information, related case information, problem information, and order information, it should be understood that a form section 60 may be associated with any other suitable information that a customer service manager or agent would view or change. In some embodiments, the form 58 may provide this information in form sections 60. For example, a "Main" form 58 may provide a details form section 60 associated with the customer service record 44 (e.g., a case number, a channel, a priority, a state, and the like), a notes form section 60 that enables the user to record notes, a product information form section 60 (e.g., a product number, an asset number, a contract number, and the like), and the like. It should be understood that the illustrated form sections 60 are only provided as examples, and that any other suitable information that a customer service manager or agent would view or change may be provided as additional or alternative form sections 60.

In some embodiments, the workspace 12 may enable the user to navigate between the forms 58 while retaining context within each form 58. That is, the user may navigate (e.g., scroll down) in the form 58 ("Main") to view certain information, open a form 59 ("Task(0)") to view other information, and then return to the form 58. The processor(s) 18 may retain the position of the form 58 such that, when the user returns to the form 58, it remains in the same position prior to opening the form 59. Moreover, if the user began entering information in the form 58 (e.g., in a text box), the processor(s) 18 may retain the information and display the information when the user returns to the form 58, even if the user has not saved the information. In this manner, the workspace 12 may reduce navigating back and forth between multiple pages or losing data entered by the user.

In some embodiments, the processor(s) 18 may display the form sections 60 as columns in the form portion 56. However, any suitable arrangement is contemplated, such as displaying the form sections 60 as rows, as regions, and the like. As such, the form sections 60 may be arranged in a responsive layout, such that the user may customize the arrangement or layout of the form sections 60. The form sections 60 may also include form section collapse icons that enable the user to collapse and expand a respective form section 60. For example, vertical form collapse icons 62 enable the user to collapse and expand a respective form section 60 vertically. Horizontal form collapse icons 63 enable the user to collapse and expand a respective form section 60 horizontally. Additionally, the workspace 12 may include one or more tab portion collapse icons 64 that enable to collapse and expand the tab portion 51. Collapsing and expanding the form sections 60 and/or the tab portion 51 may decrease scrolling for the user, which may result in increased efficiency and productivity. In this manner, the workspace 12 enables the user to view a greater amount of data, provides more convenient access to information, and provides flexibility to the user to customize the workspace 12. Moreover, the workspace 12 may enable the user to manage cases and/or tasks on a single page (e.g., a single webpage), rather than navigating back and forth between multiple pages (resulting from selecting different customer service records).

The workspace may also include a footer bar 65 that includes icons for supporting components, such as a scratchpad component icon 66, an attachment component icon 68, an email component icon 70, and the like. The scratchpad component may enable the user to make and record notes. The attachment component may enable the user to conveniently attach a document, picture, video, and the like, to send to another user. The email component may enable the user to email another user. In some embodiments, the processor(s) 18 may incorporate context of the workspace 12 in the supporting component when appropriate. For example, if the workspace 12 is opened to a particular case (e.g., "Case001"), and if the user opens the email component by selecting the email component icon 70, the subject line of the email may retrieve context from the workspace 12 (such that the subject line is "Re: Case001"). It should be understood that the scratchpad component, the attachment component, and the email component are non-limiting examples of supporting components, and any other suitable supporting components (e.g., a chat client, a knowledge base, an internet browser window, a computer telephony integration window, and the like) are contemplated in the present disclosure. In particular, each supporting component may open a prompt that may not navigate away from the workspace 12. In this manner, the workspace enables greater functionality without navigating back and forth between multiple pages, increasing efficiency and productivity.

Figure 4:
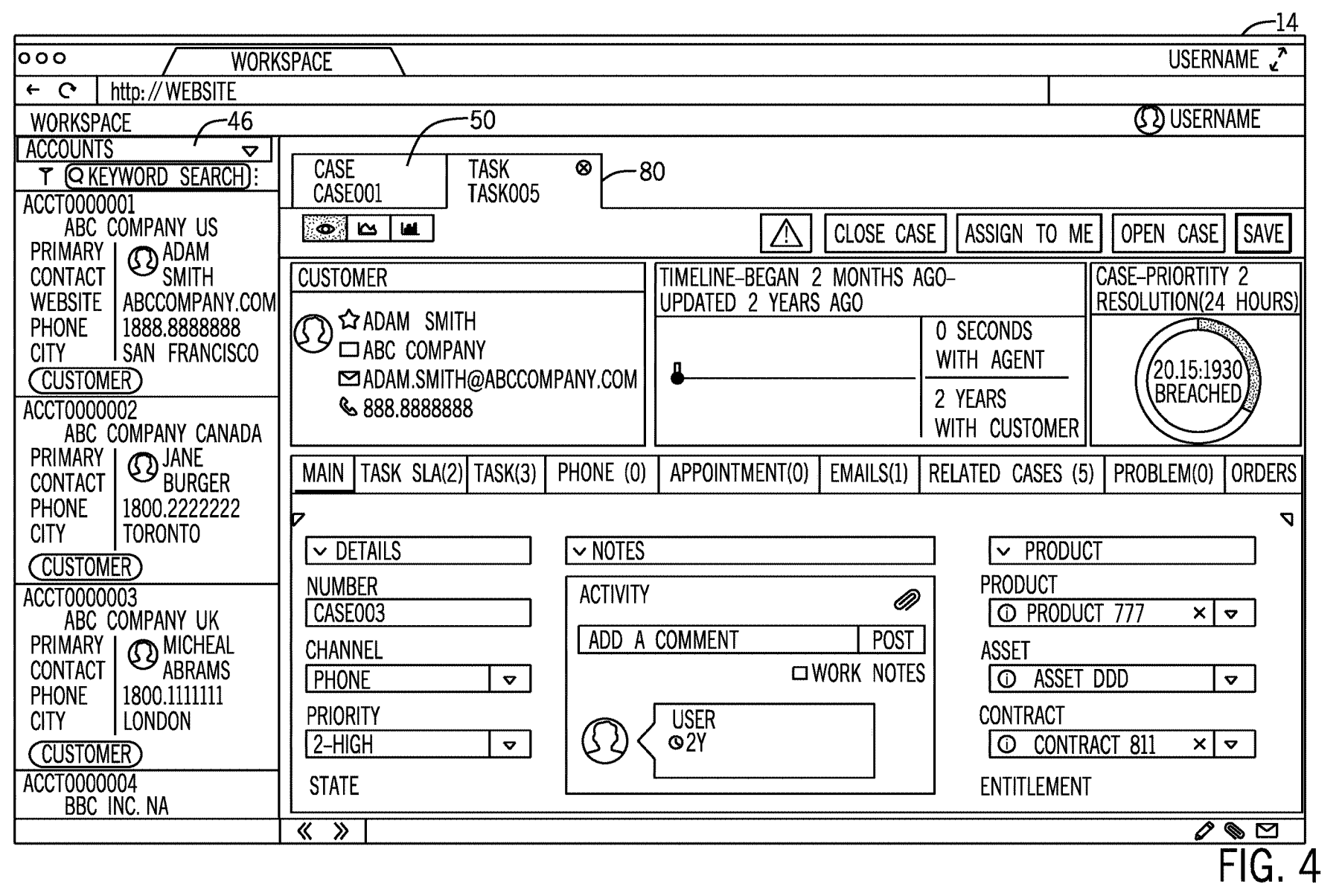

FIG. 4 is a diagram of the workspace 12 of FIG. 3 with multiple tabs 50 open, in accordance with an embodiment of the present disclosure. As illustrated, a second tab 80 is open that is associated with a task (e.g., "Task005"). The processor(s) 18 may generate the second tab 80 when the user selects a task (e.g., in a form section 60 of a task form 58). In some embodiments, the workspace 12 may enable the user to navigate between tabs 50 while retaining context within each tab 50. That is, the user may navigate (e.g., scroll down) in the tab portion 51 of the tab 50 ("Case001") of the workspace 12 of FIG. 3 to view certain information, open the tab 80 ("Task005") to view other information, and then return to the tab 50. The processor(s) 18 may retain the position of the tab portion 51 of the tab 50 such that, when the user returns to the tab 50, it remains in the same position prior to opening the tab 80. Moreover, if the user began entering information in the tab 50 (e.g., in a text box), the processor(s) 18 may retain the information and display the information when the user returns to the tab 50, even if the user has not saved the information. Additionally, context of the customer service record list portion 42 may be retained while the user navigates through various tabs 50. That is, the customer service record list portion 42 may retain a same position showing the same information while the user opens, closes, and selects various tabs 50. Furthermore, context in the forms 58 may be retained as explained above, even while context in the tabs 50 is retained. In this manner, the workspace 12 may reduce navigating back and forth between multiple pages or losing data entered by the user. The workspace 12 of FIG. 4 also shows a list of customer service accounts 82 in the customer service record list portion 42 because the user selected "Accounts" in the navigation menu 46.

In some embodiments, when a threshold number of tabs 50 is met or exceeded (e.g., 5 tabs, 7 tabs, 10 tabs, 12 tabs, or any other suitable number of tabs), the processor(s) 18 may generate a scrolling mechanism to enable the user to scroll between the tabs 50.

Figure 5:
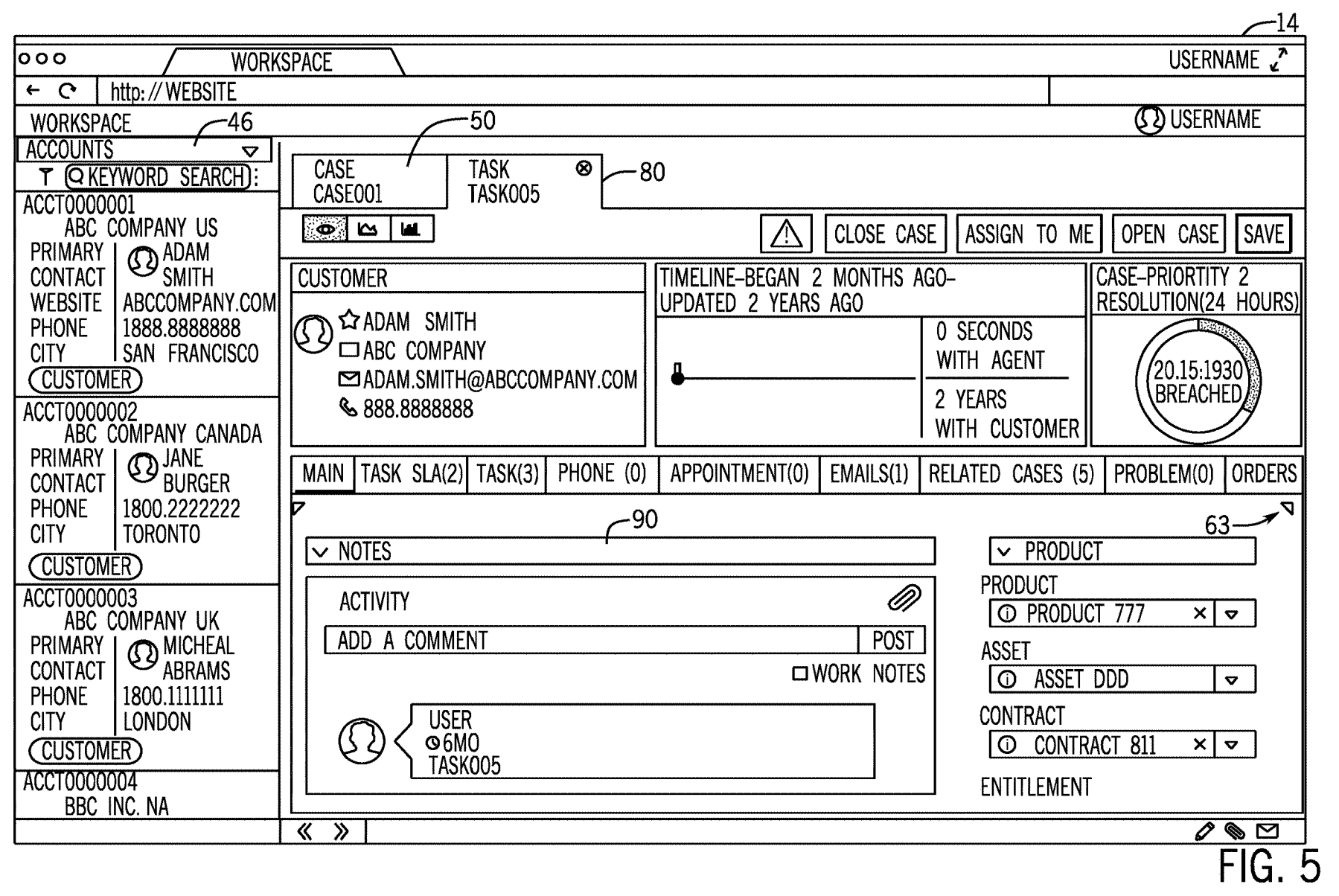

FIG. 5 is a diagram of the workspace 12 of FIG. 4 with a form section 60 ("Details") horizontally collapsed, in accordance with an embodiment of the present disclosure. The user may select a leftmost horizontal form collapse icon 63 to collapse the form section 60. As a result, a second leftmost (middle) form section 90 ("Notes") expands horizontally to fill the space once occupied by the form section 60. The context of the workspace (e.g., within the tabs 50 and the forms 58, including the collapsed form section 60) may be retained, even when the form section 60 is collapsed. In this manner, the workspace may enable the user to more conveniently view desired data and avoid viewing undesired data while retaining entered data.

Figure 6:
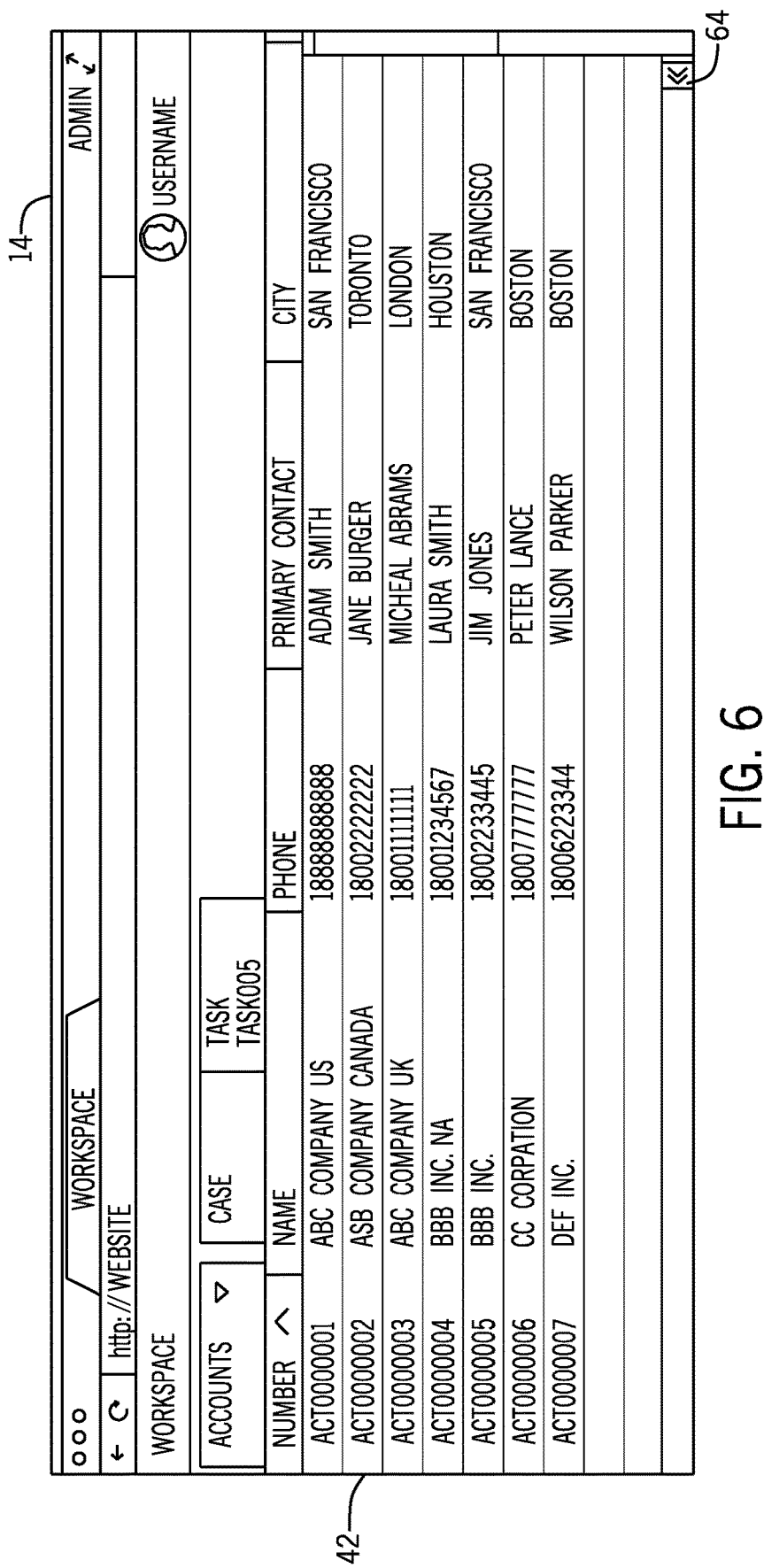
FIG. 6 depicts the workspace of FIG. 4 with a tab portion collapsed, in accordance with an embodiment of the present disclosure.

FIG. 6 is a diagram of the workspace 12 of FIG. 4 with the tab portion 51 collapsed, in accordance with an embodiment of the present disclosure. The user may select the tab portion collapse icon 64 to collapse the tab portion 51. As a result, the customer service record list portion 42 expands to fill the space once occupied by the tab portion 51. As illustrated, the processor(s) 18 may display the customer service record list portion 42 in a table format when expanded. The context of the workspace (e.g., within the tabs 50 and the forms 58, including the collapsed tab portion 51) may be retained, even when the tab portion 51 is collapsed. In this manner, the workspace may enable the user to more conveniently view desired data and avoid viewing undesired data while retaining entered data.

FIG. 7 is a diagram of the workspace 12 of FIG. 4 with a related cases form 110 ("Related Cases") selected, in accordance with an embodiment of the present disclosure. As illustrated, the related cases form 110 displays a list of customer service cases 48 related to a selected tab 50. In some embodiments, when the user resolves a customer service case 48, the processor(s) 18 may automatically apply the resolution to related customer service cases 48. For example, the processor(s) 18 may automatically resolve a related customer service case 48 when the user resolves the original customer service case 48. As another example, the processor(s) 18 may automatically update or advance a status (e.g., a milestone, a task, and the like) of a related customer service case 48 when the user resolves the original customer service case 48. In this manner, the workspace 12 may resolve customer service cases faster and perform functions without explicit user interaction, increasing efficiency and productivity.

Figure 8:
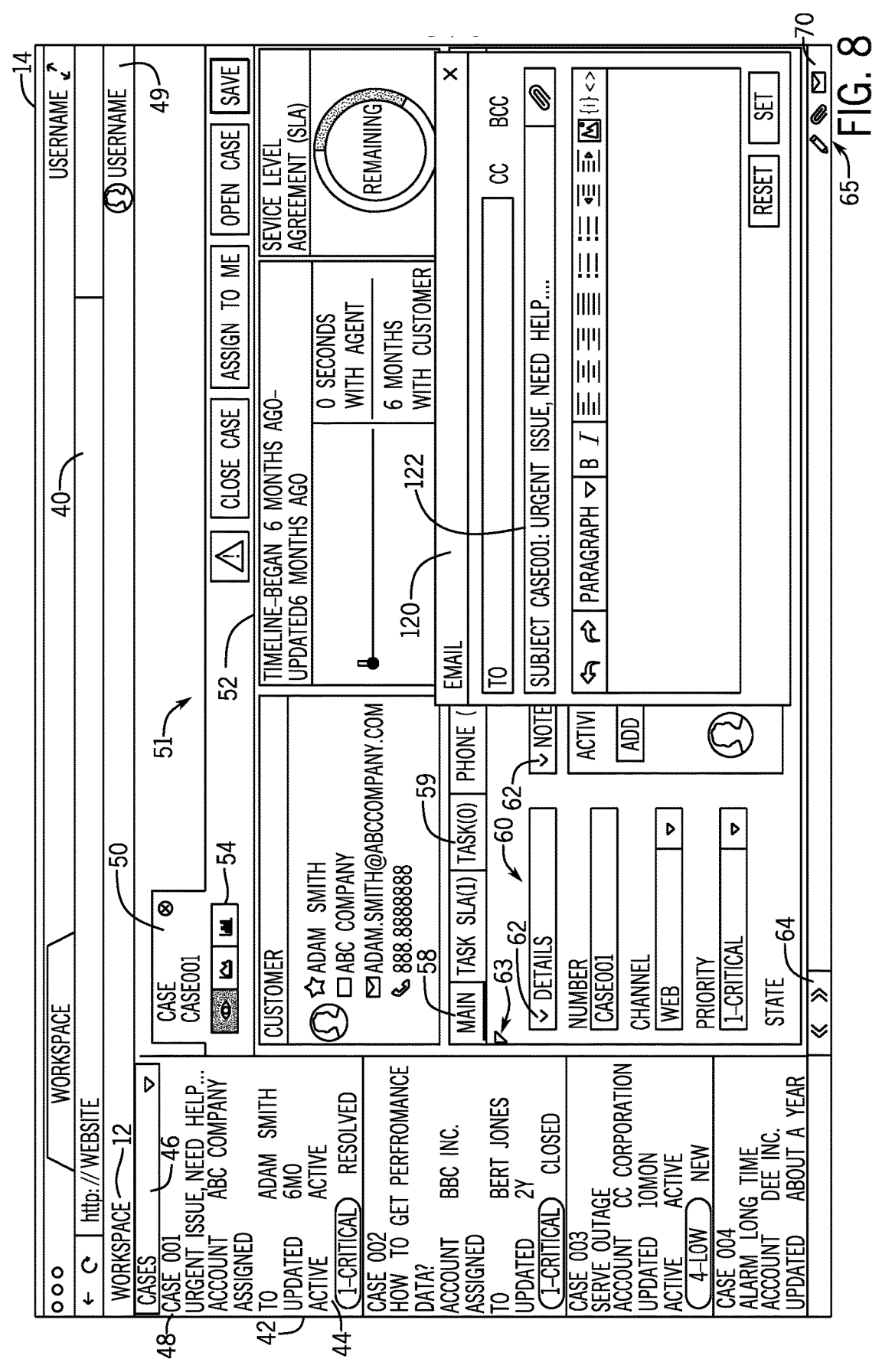

FIG. 8 is a diagram of the workspace 12 of FIG. 4 with an email component 120 open, in accordance with an embodiment of the present disclosure. The user may select the email component icon 70 to open the email component 120. As illustrated, the processor(s) 18 may use context of the customer service record 44 that the user is viewing and/or has opened to partially fill in fields of the email component 120. In particular, the processor(s) 18 may fill in a subject field 122 of the email component 120 with identification information (e.g., case number "Case001", account number, contact name, and the like) and a title, summary, or description (e.g., "Urgent issue, need help . . . "). In this manner, the workspace 12 may anticipate the user's actions and increase efficiency and productivity.

Figure 9:
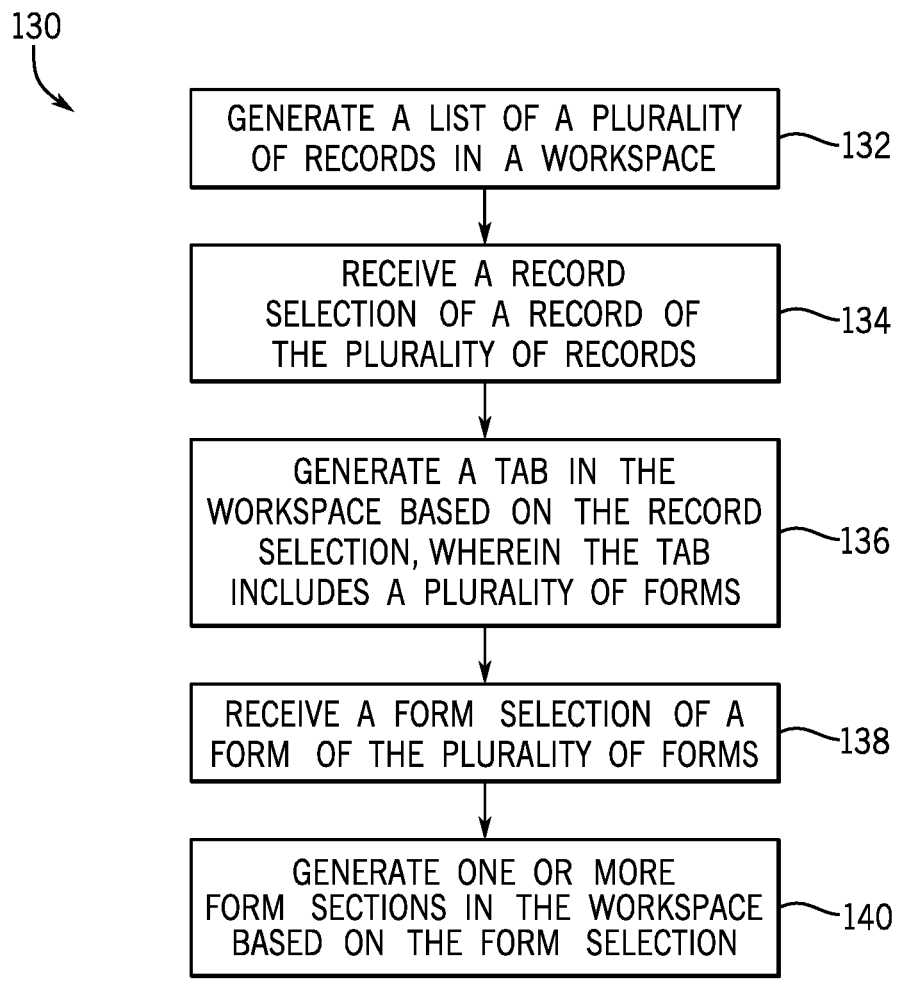
FIG. 9 is a flowchart of a method for managing customer service issues using the workspace of FIG. 1, in accordance with an embodiment of the present disclosure.

With the foregoing in mind, FIG. 9 is a flowchart of a method 130 for managing customer service issues using the workspace 12 of FIG. 1, in accordance with an embodiment of the present disclosure. While the method 130 is described using steps in a specific sequence, it should be understood that the present disclosure contemplates that the described steps may be performed in different sequences than the sequence illustrated, and certain described steps may be skipped or not performed altogether. In some embodiments, the method 130 may be implemented by executing instructions stored in a tangible, non-transitory, computer-readable medium, such as the memory device(s) 22, using a processor, such as the processor(s) 18. In certain embodiments, the client 16 may perform the method 130, but it should be noted that any suitable computing system may perform the method 130.

The processor(s) 18 may generate (block 132) a list of a plurality of records in a workspace. The record may be associated with a case, account, contact, and the like. For example, the processor(s) 18 may generate the customer service record list portion 42 that lists the customer service records 44 in the workspace 12.

The processor(s) 18 may then receive (block 134) a record selection of a record of the plurality of records. For example, the processor(s) 18 may receive a customer service record selection from the user of a customer service record 44 in the customer service record list portion 42. In some embodiments, the record selection may be made automatically. For example, the processor(s) 18 may receive a record selection of the first customer service record 44 in the customer service record list portion 42 as a default record 44. In some embodiments, the processor(s) 18 may receive a record selection of a last or most recent customer service record 44 viewed, accessed, changed, or otherwise worked on by the user.

The processor(s) 18 may generate (block 136) a tab 50 in the workspace 12 based on the record selection, wherein the tab 50 includes a plurality of forms 58. For example, the processor(s) 18 may generate the tab 50 associated with the record selection of a customer service record 44. The tab 50 may include a plurality of forms 58, such as main information, task service level agreement information, task information, phone information, appointment information, email information, related case information, problem information, order information, and the like.

The processor(s) 18 may receive (block 138) a selection of a form 58 of the plurality of forms 58. For example, the processor(s) 18 may receive a form selection from the user of the form 58. In some embodiments, the form selection may be made automatically. For example, the processor(s) 18 may receive a form selection of the first form 58 (e.g., the "Main" form) in the form portion 56 as a default form 58. In some embodiments, the processor(s) 18 may receive a form selection of a last or most recent form 58 viewed, accessed, changed, or otherwise worked on by the user.

The processor(s) 18 may then generate (block 140) one or more form sections 60 in the workspace 12 based on the form selection. For example, the processor(s) 18 may generate the form sections 60 (e.g., "Details," "Notes," "Product," and the like) associated with the form selection of a form 58.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A workspace system used for customer service-related activities, comprising:
   a non-transitory, machine-readable medium; and
   one or more processors configured to execute instructions stored in the non-transitory, machine-readable media to perform operations comprising:
   generating a plurality of summary lists based on customer service information stored in a database, wherein the plurality of summary lists comprises a first summary list of a plurality of customer service case summaries, wherein the plurality of summary lists comprises a second summary list of a plurality of accounts, and wherein the plurality of summary lists are generated prior to receiving a menu selection;
   displaying a workspace comprising a column display pane, wherein the column display pane comprises a navigation menu configured to cause the column display pane to display a selected summary list of the plurality of summary lists based on the menu selection within the navigation menu;
   in response to receiving a first menu selection within the navigation menu corresponding to the first summary list of the plurality of summary lists, displaying the first summary list of the plurality of customer service case summaries corresponding to a plurality of customer service cases within the column display pane in response to receiving the first menu selection, wherein each customer service case summary is displayed in a first format and comprises:
   an account number associated with a respective customer service case;
   an issue summary providing a summary of an issue associated with the respective customer service case;
   an identity of a customer service agent associated with the respective customer service case;
   a resolution status indicative of a progress relative to completion of the respective customer service case; and
   a criticality rating indicative of an urgency to respond to the respective customer service case;

in response to receiving a selection of a customer service case summary corresponding to a customer service case from the first summary list:
displaying a tab in the workspace associated with the customer service case corresponding to the selected customer service case summary while displaying the first summary list of the plurality of customer service cases summaries within the column display pane;
displaying tab content associated with the tab, wherein the tab content provides a ribbon container, wherein the tab content comprises one or more buttons configured to change a status of the customer service case, and wherein the tab content comprises one or more form sections
in response to receiving a second menu selection within the navigation menu corresponding to the second summary list of the plurality of summary lists, displaying the second summary list of the plurality of account summaries associated with the plurality of customer services cases within the column display pane in response to receiving the second menu selection, wherein each account summary is displayed in a second format that is different than the first format and each account summary comprises:
an identity of a customer service agent associated with an account related to the respective customer service case; and
contact information associated with a customer associated with a subset of the plurality of customer service cases.

2. The workspace system of claim 1, wherein the one or more processors are configured to execute instructions to perform operations comprising displaying the workspace on a single page of the workspace system.

3. The workspace system of claim 1, wherein the tab is collapsible.

4. The workspace system of claim 3, wherein the one or more processors are configured to perform the operations comprising displaying the summary list of the plurality of customer service cases in a table layout when the tab is collapsed.

5. The workspace system of claim 3, wherein the one or more processors are configured to perform the operations comprising displaying the summary list of the plurality of customer service cases in the column display pane when the tab is not collapsed.

6. The workspace system of claim 1, wherein the tab provides information associated with an account summary, a service level agreement, a timeline, a case history, customer data, or any combination thereof.

7. The workspace system of claim 1, wherein a plurality of tabs comprises the tab, wherein the one or more processors are configured to execute the instructions to perform the operations comprising enabling scrolling of the plurality of tabs when a number of tabs of the plurality of tabs meets or exceeds a threshold number of tabs.

8. The workspace system of claim 1, wherein each customer service record case comprises:
an update status that indicates when a previous update was made regarding the respective customer service case; and
contact information associated with a customer associated with the respective customer service case.

9. A system comprising:
a non-transitory, machine-readable medium;
one or more processors configured to execute instructions stored in the non-transitory, machine-readable media to:
generate a plurality of summary lists based on customer service information stored in a database accessible by the one or more processors, wherein the plurality of summary lists comprises a first summary list of a plurality of customer service case summaries, and wherein the plurality of summary lists are generated prior to receiving a menu selection; and
generate a graphical user interface, wherein the graphical user interface comprises:
a workspace comprising a customer service case list portion and a collapsible tab portion, wherein:
the customer service case list portion comprises a column display pane and a navigation menu, wherein the navigation menu is configured to cause the column display pane to display a selected summary list of the plurality of summary lists in response to receiving a first menu selection within the navigation menu, wherein the column display is configured to display the first summary list of a plurality of customer service cases summaries in response to receiving a first menu selection within the navigation menu corresponding to the first summary list of the plurality of summary lists, and wherein each customer service case summary is displayed in a first format and each customer service case summary comprises:
an account number associated with a respective customer service case;
an issue summary providing a summary of an issue associated with the respective customer service case;
an identity of a customer service agent associated with the respective customer service case;
a resolution status indicative of a progress relative to completion of the respective customer service case; and
a criticality rating indicative of an urgency to response to the respective customer service case; and
the collapsible tab portion is configured to display one or more tabs associated with the plurality of customer service case summaries based on one or more selections of one or more customer service cases of the plurality of customer service cases while the customer service case list portion lists each customer service case summary within the column display pane, wherein the collapsible tab portion comprises a form portion comprising one or more forms, wherein each form of the one or more forms comprises one or more collapsible form sections;
a communication region comprising an email button configured to display an email comprising one or more email fields that are filled in using the account number and the issue summary of a customer service case summary associated with a currently displayed tab of the one or more tabs.

10. The system of claim 9, wherein the one or more processors are configured to execute the instructions to retain context in the workspace when:

the collapsible tab portion is collapsed and not collapsed; and each collapsible form section of the one or more collapsible forms sections is collapsed and not collapsed.

11. The system of claim 9, wherein the one or more customer service cases of the plurality of customer service cases are associated with customer service cases, customer service accounts, or customer service contacts.

12. The system of claim 9, wherein the form of the one or more forms is associated with identification information, priority information, task information, contact information, related case information, problem information, or order information, of the customer service case.

13. The system of claim 9, wherein the responsive layout comprises configuring at least one form section of the one or more form sections in at least one row.

14. The system of claim 9, wherein the workspace comprises a footer bar comprising supporting components, wherein the supporting components comprise a scratchpad component, an attachment component, or any combination thereof.

15. The system of claim 9, wherein the plurality of summary lists comprises a second summary list of a plurality of accounts, and wherein the column display is configured to display the second summary list of a plurality of account summaries associated with the plurality of customer services cases within the column display pane in response to receiving a second menu selection, wherein each account summary is displayed in a second format that is different from the first format and each account summary comprises:

an identity of a customer service agent associated with an account related to the respective customer service case; and contact information associated with a customer associated with a subset of the plurality of customer service cases.

16. A method comprising:

generating, via one or more processors, a plurality of summary lists based on customer service information stored in a database, wherein the plurality of summary lists comprises a first summary list of a plurality of customer service case summaries, and wherein the plurality of summary lists are generated prior to receiving the menu selection;

displaying, via the one or more processors, a workspace comprising a column display pane, wherein the column display pane comprises a navigation menu configured to cause the column display pane to display a selected summary list of the plurality of summary lists based on the menu selection within the navigation menu;

receiving, via the one or more processors, a first menu selection within the navigation menu corresponding to the first summary list of the plurality of summary lists;

displaying, via the one or more processors, the first summary list of a plurality of customer service case summaries corresponding to a plurality of customer service cases within a column display pane in the workspace, wherein each customer service case summary is displayed in a first format and each customer service case summary comprises:

an account number associated with the respective customer service case;

an issue summary providing a summary of an issue associated with a respective customer service case;

an identity of a customer service agent associated with the respective customer service case;

a resolution status indicative of a progress relative to completion of the respective customer service case; and a criticality rating indicative of an urgency to response to the respective customer service case;

receiving, via the one or more processors, a customer service case selection of a customer service case summary of the plurality of customer service case summaries;

generating, via the one or more processors, a tab in the workspace based on a customer service case corresponding to the customer service case selection, wherein the tab includes a plurality of forms;

displaying, via the one or more processors, the tab in the workspace based on the customer service case corresponding to the customer service case selection while displaying the first summary list of the plurality of customer service case summaries within the column display pane;

receiving, via the one or more processors, a form selection of a form of the plurality of forms;

generating, via the one or more processors, one or more form sections in the workspace based on the form selection;

receiving, via the one or more processors, a second menu selection within the navigation menu corresponding to a second summary list of the plurality of summary lists; and displaying, via the one or more processors, the second summary list of the plurality of account summaries associated with the plurality of customer services cases within the column display pane in response to receiving the second menu selection, wherein each account summary is displayed in a second format that is different than the first format and each account summary comprises:

an identity of a customer service agent associated with an account related to the respective customer service case; and contact information associated with a customer associated with a subset of the plurality of customer service cases.

17. The method of claim 16, comprising resolving, via the one or more processors, the customer service case.

18. The method of claim 17, comprising resolving, via the one or more processors, at least one related customer service case of one or more related cases based at least in part on resolving, via the one or more processors, the customer service case.

* * * * *